US011793353B2

(12) United States Patent
Moksin et al.

(10) Patent No.: US 11,793,353 B2
(45) Date of Patent: Oct. 24, 2023

(54) HEATING CONTAINER

(71) Applicant: SOMi LLC, Cincinnati, OH (US)

(72) Inventors: Margarita Moksin, Cincinnati, OH (US); Traila Florin, Resita (RO); Druta Paul Florin, Resita (RO)

( * ) Notice: Subject to any disclaimer, the term of this patent is extended or adjusted under 35 U.S.C. 154(b) by 366 days.

(21) Appl. No.: 16/940,022

(22) Filed: Jul. 27, 2020

(65) Prior Publication Data

US 2021/0007547 A1 Jan. 14, 2021

Related U.S. Application Data

(63) Continuation-in-part of application No. 15/449,258, filed on Mar. 3, 2017, now abandoned.

(51) Int. Cl.
*A47J 36/24* (2006.01)
*A47J 36/32* (2006.01)
*A47J 41/00* (2006.01)

(52) U.S. Cl.
CPC ........... *A47J 36/2483* (2013.01); *A47J 36/32* (2013.01); *A47J 41/005* (2013.01); *A47J 41/0094* (2013.01)

(58) Field of Classification Search
CPC ...... A47J 36/2483; A47J 36/32; A47J 41/005; A47J 41/0094
See application file for complete search history.

(56) References Cited

U.S. PATENT DOCUMENTS

| | | |
|---|---|---|
| 5,270,230 A | 12/1993 | Sakurai |
| 6,017,797 A | 1/2000 | Furukawa |
| 6,121,585 A | 9/2000 | Dam |
| 6,123,065 A | 9/2000 | Casper et al. |
| 7,104,184 B2 | 9/2006 | Biderman et al. |
| 8,851,739 B2 | 10/2014 | Gonzalez |
| 2008/0047948 A1* | 2/2008 | Rosenbloom ........... A47J 36/26 219/386 |
| 2010/0078422 A1* | 4/2010 | Staab ..................... H05B 1/025 219/494 |
| 2012/0007443 A1 | 1/2012 | Tsai et al. |
| 2015/0312964 A1 | 10/2015 | Sorenson et al. |
| 2016/0037966 A1 | 2/2016 | Chin et al. |
| 2017/0131736 A1 | 5/2017 | Acar et al. |
| 2020/0316612 A1 | 10/2020 | Wallgren |

* cited by examiner

*Primary Examiner* — Dana Ross
*Assistant Examiner* — Joe E Mills, Jr.

(57) ABSTRACT

A portable thermal device includes a housing having a thermally conductive container accessible through an opening. Batteries are contained in the housing. A power supply circuit is in electrical communication between an electrical heater and batteries contained in the to power the electrical heater. In one aspect, an electrical heater uses metal oxide semiconductor field effect transistors (MOSFETs) in thermal contact with the thermally conductive container that are driven in a heat generating range by the power supply circuit. In another aspect, a controller: (i) identifies a thermal profile associated for preparing and maintaining a particular food in the thermal conductive container; (ii) associates the thermal profile with stored power in the one or more batteries; and (iii) communicates via a user interface a limitation on performing the thermal profile based on the stored power.

20 Claims, 13 Drawing Sheets

HEATING CONTAINER

CLAIM OF PRIORITY UNDER 35 U.S.C. § 120

The present Application for Patent is a continuation-in-part (CIP) of patent application Ser. No. 15/449,258 entitled "Food Heating Container" filed 3 Mar. 2017, pending, and assigned to the assignee hereof and hereby expressly incorporated by reference herein.

BACKGROUND OF THE INVENTION

1. Field of the Invention

The field of art disclosed herein pertains to a portable food and beverage warming device, and more particularly to automatically controlled and remotely controllable portable food and beverage warming devices.

2. Description of the Related Art

People are becoming more mobile and attentive to what they eat and what they feed themselves and their children. There are a number of alternatives on the market that simplifies preparation of healthy food at home. However, individuals that live an active lifestyle such as with participation in outdoor activities, work or frequent travel can find it challenging to eat and feed his or her children healthy food. Keeping the food cold for preservation and then finding a way to warm up the food while maintaining an active lifestyle may be difficult because of the limiting requirement of an electrical outlet, microwave, or stove.

Devices have been disclosed in the prior art that relate to food warming devices. These include devices that have been patented and published in patent application publications. Various devices have been disclosed that generally relate to portable food warming appliances having heating elements for warming food placed therein. Beverage containers with provisions for electrically heating the contained beverage are described by, for example, Dam, U.S. Pat. No. 6,121,585. An electrically heated beverage container designed to plug into an automobile cigarette lighter is marketed by The Johnson Smith Company, Bradenton, Fla. as their "Clever Cup." A container designed for infant milk or formula, in which the fluid can be heated by electrical or exothermic reaction, is taught by Teglbjarg, U.S. Pat. No. 6,123,065. Also known in the art are electrically heated devices for warming infant nursing bottles or food containers, such as the "Baby Bottle and Food Warmer", Item No. 09234, distributed by One Step Ahead/Leaps And Bounds Co., of Lake Bluff, Ill.; this device is essentially a small electrically heated water bath in which food or drink containers are partially immersed. These devices involve the use of a specialized container for the beverage.

U.S. Pat. Publication No. 2015/0245723 A1 to Alexander discloses a portable heating container that controls a heating element to maintain a temperature setpoint. A simple on/off control can be actuated via a remote control. Although maintaining temperature is helpful, most of the control decisions need to be made manually by a person. The user needs to determine what an appropriate temperature is for a particular food or beverage. The user is also responsible for determining whether the food or beverage is being appropriately maintained without risk of contamination or spoilage.

In light of the devices disclosed in the prior art, it is submitted that the present invention substantially diverges in design elements from the prior art and consequently it is clear that there is a need in the art for an improvement to existing food warming devices.

SUMMARY OF THE INVENTION

In one aspect, the present disclosure provides a portable thermal device includes a housing having an opening and a thermally conductive container contained in the housing and accessible through the opening. One or more batteries are contained in the housing. An electrical heater includes one or more metal oxide semiconductor field effect transistors (MOSFETs) in thermal contact with the thermally conductive container. A power supply circuit is in electrical communication between the electrical heater and the one or more batteries to power the electrical heater by driving the one or more MOSFETs in a heat generating range.

In another aspect, the present disclosure provides a portable thermal device that includes a housing having an opening and a thermally conductive container contained in the housing and accessible through the opening. One or more batteries are contained in the housing. An electrical heater is in thermal contact with the thermally conductive container. A power supply circuit is in electrical communication between the electrical heater and the one or more batteries to power the electrical heater. A controller is communicatively coupled to the electrical heater and the power supply. The controller: (i) identifies a thermal profile associated for preparing and maintaining a particular food in the thermal conductive container; (ii) associates the thermal profile with stored power in the one or more batteries; and (iii) communicates via a user interface a limitation on performing the thermal profile based on the stored power.

In an additional aspect, the present disclosure provides a method for operating a portable thermal device. In one or more embodiments, the method includes identifying a thermal profile associated for preparing and maintaining a particular product in a thermal conductive container of a portable thermal device. The method includes associating the thermal profile with stored power in one or more batteries of the portable thermal device. The method includes monitoring a temperature of the particular product. The method includes activating a heater that is in thermal contact with the thermal conductive container to adjust the temperature of the particular product according to the thermal profile. The method includes communicating via a user interface a predicted future limitation on performing the thermal profile based on the stored power.

These and other features are explained more fully in the embodiments illustrated below. It should be understood that in general the features of one embodiment also may be used in combination with features of another embodiment and that the embodiments are not intended to limit the scope of the invention.

BRIEF DESCRIPTION OF THE DRAWINGS

The various exemplary embodiments of the present invention, which will become more apparent as the description proceeds, are described in the following detailed description in conjunction with the accompanying drawings, in which.

DETAILED DESCRIPTION

Figure 1:
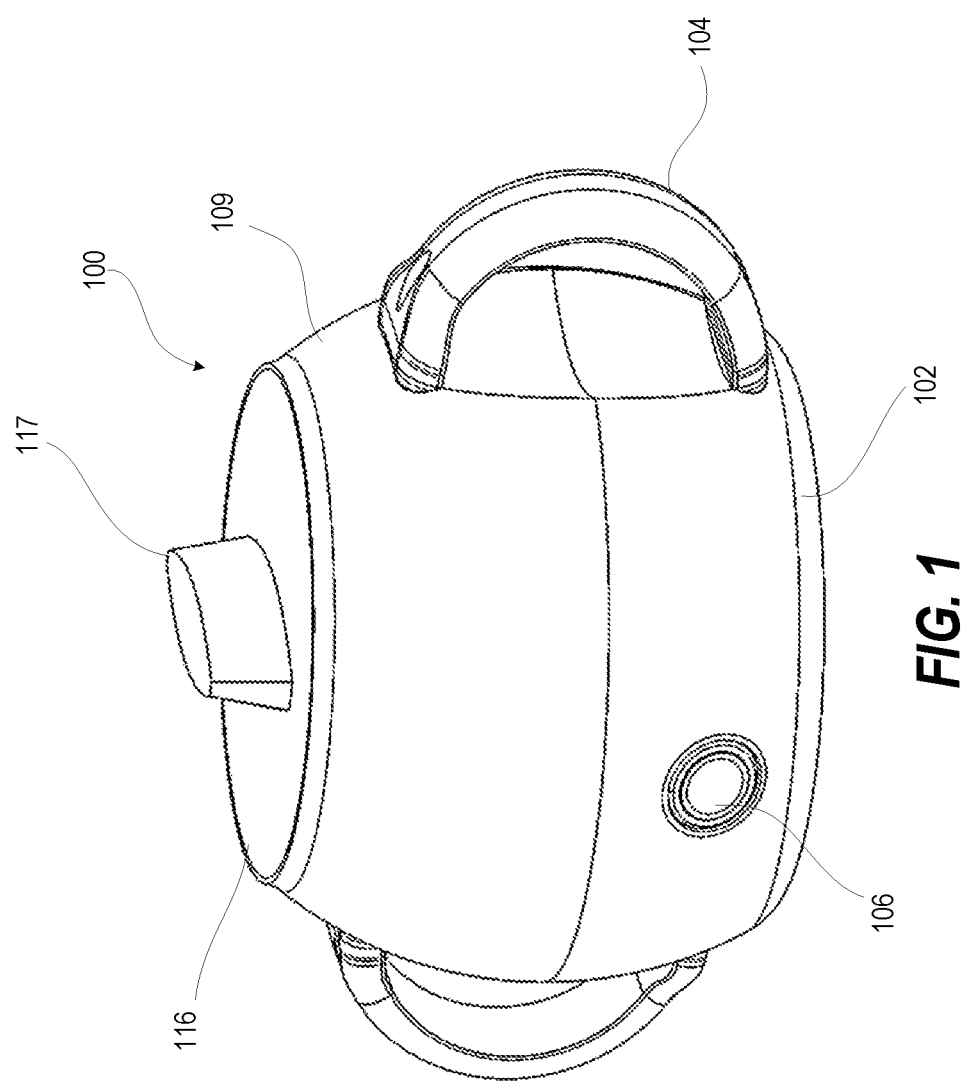
FIG. 1 illustrates an isometric view of a Heating Container (HC), according to one or more embodiments.

The present innovation relates generally to a Heating Container (HC) that is a portable and rechargeable heating container that allows an individual to warm food or drink without using traditional heating devices. In one embodiment, the warming device comprises a housing that resembles a thermos or a pot. The housing includes an interior volume defining a heating chamber in which food, beverage, or other substance or mixture can be placed for heating. The housing includes a charging dock and a battery powered heating element operated via a control switch for electrically heating the food within the heating chamber. Once charged, the device is operable without being plugged into an electrical outlet.

The design of the invention can take on any number of configurations, depending on the intended use of the device. All configurations have at least the following components, at least one internal compartment holds the contents to be warmed, such as food, liquids, lotions, or towelettes. This compartment can be of a different size and shape dependent on the intended use.

In one aspect, the present disclosure provides a new product warming device wherein the same can be utilized for providing convenience for the user when heating food prior to consumption. In another embodiment of the portable product warming device of the present invention, a thermostatic switch is incorporated to maintain the temperature at the optimum point regardless of ambient temperature variations.

In another aspect, the present disclosure provides a portable product warming device that includes a housing having an upper opening. The portable product warming device includes a thermally conductive container contained in the housing an accessible through the upper opening. The portable product warming device includes a lid selectively received in the upper opening to close the housing. The portable product warming device includes one or more rechargeable batteries contained in the housing. The portable product warming device has electrical circuitry contained in the housing comprising: (i) an electrical heater in thermal contact with the thermally conductive container, (ii) a power supply circuit in electrical communication between the electrical heater and the one or more rechargeable batteries to power the electrical heater, (iii) a user control attached to the housing to activate the power supply circuit, (iv) a recharging circuit having a connector that is connectable to an external source of electrical power and that recharges the one or more rechargeable batteries, (v) an output indicator having at least two states to indicate a device status, (vi) a temperature measuring circuit to measure a current temperature of the container, and (vii) a controller in communication with the temperature sensing circuit, the output indicator, and the power supply circuit to activate the electrical heater until a temperature set point sensed by the temperature measuring circuit is reached and to indicate a current device status via the output indicator.

In one or more embodiments, the heating of the food is achieved through an electric heating system powered by the accumulators and controlled by an electronic circuit. The HC can heat up the food or drink, up to 70° C. or higher. The HC can be used for multiple, complete heating cycles on one charging. The housing includes a charging dock and a battery powered heating element operated via a control switch for electrically heating the food within the heating chamber so the HC could be used away from any external power source. Once charged, the device is operable without being plugged into an electrical outlet. The device comprises an on and off switch to activate heating mechanism and has an indicator, such as an LED or OLED light or screen, for the accumulators, heating and charging status. The system makes it perfect for traveling and parent on the go. The HC has a convenient design perfect for both holding and carrying in a bag. The device of the present invention can readily be used at any time to provide heat for a food or liquid, it being only necessary to periodically recharge the power unit by plugging it into a wall socket or other alternate power source such as a solar panel, a fuel cell, a cigarette lighter socket, etc.

Although the present invention has been described as employing a rechargeable battery, it is within the scope of the present invention to utilize non-rechargeable, disposable batteries. It is also within the scope of the present invention to utilize a known, conventional battery supply within the heater assembly. If desired, the battery-equipped container warmer could contain a switch to select between "Heat" and "Recharge" modes, to allow use of external electrical power when available to maintain the hot beverage at the desired temperature. Alternately, the battery-equipped container warmer could contain an On-Off switch for the heater, in embodiments where the container warmer would be continually recharging when connected to the external power source. In further alternative embodiments of embodiments of the HC of the present invention include batteries in a separable unit that are replaceable and that are rechargeable. The design and fabrication of a suitable recharging unit would be within the purview of one skilled in the art. Extra battery units could be provided, so that a user of the HC of the present invention could always have a fully charged battery available whenever the user wished to heat a food product.

In one or more embodiments, the device of the present invention is a portable HC powered by rechargeable accumulators, with high efficiency. The challenge is to bring to consumer market a product, which is able to use in a smart way the high heating capacity of the wires (such as thin and thick film resistors and Kanthal® wires), while consuming a small quantity of electrical energy as possible from the accumulators. In an exemplary embodiment, the HC is designed for the following specification requirements: (i) Container volume: 330 ml; (ii) Heating interval: 5° C.-70° C.; (iii) Power capacity: up to 3 heating cycles; and (iv) Electronic control and live monitoring of the heating process. In another embodiment, the heating and power storage enable a higher heating interval and more heating cycles.

The device of the present invention may be used for containing a temperature degradable liquid such as milk. For example, the container's cavity may be filled with milk at about 4° C. To avoid food poisoning or dispensing of degraded milk, such milk should not be used once its temperature has exceeded 10 to 15° C. To avoid dispensing of degraded milk, the container includes a device to monitor the temperature of the liquid in the container's closed cavity. In one or more embodiments, the device keeps the liquid refrigerated until close to the time to consume. The device tracks the time since exposed, the time and temperature profile when refrigerated, and the time and temperature profile of heating in order to ensure safety and convenience for the consumer.

Figure 2:
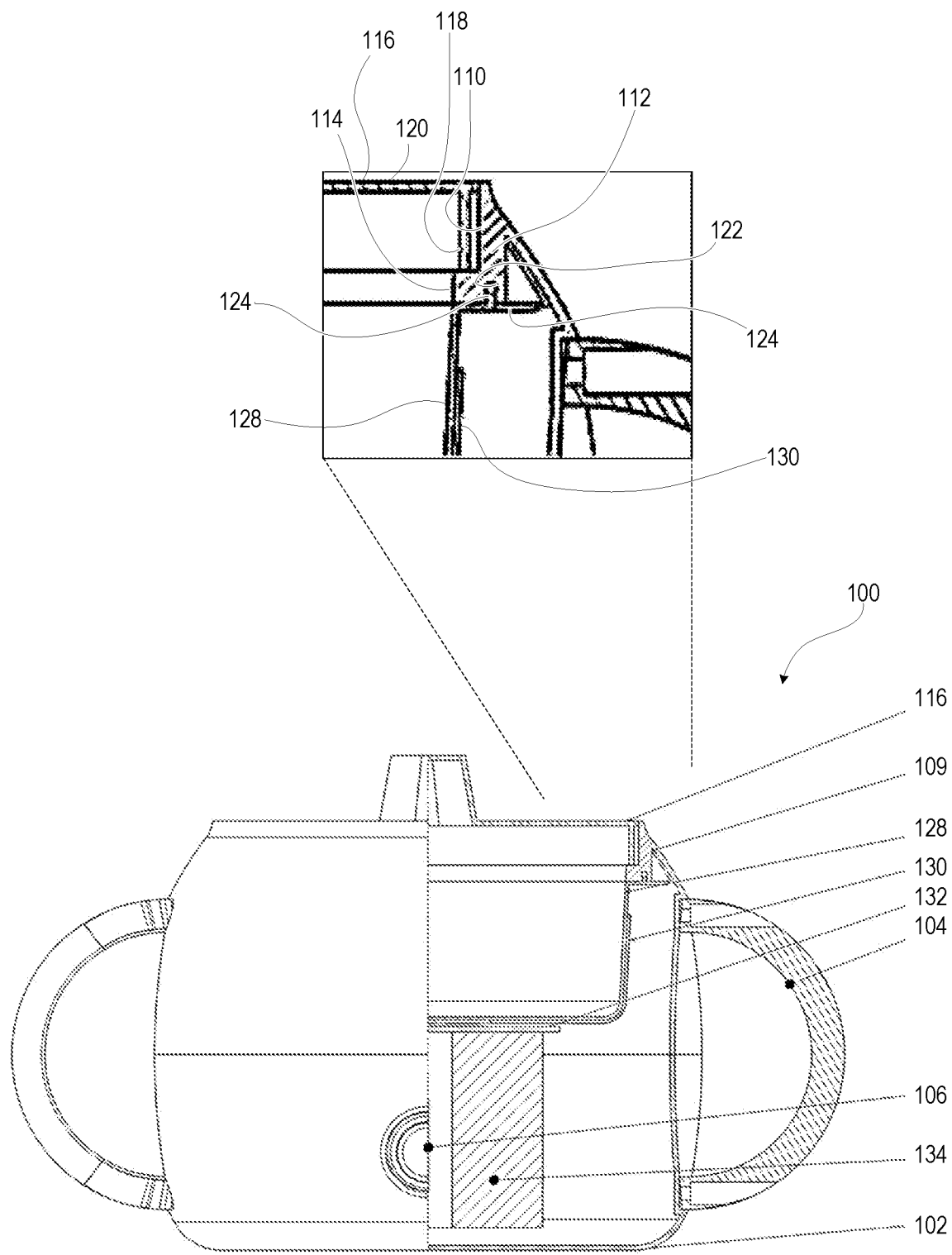
FIG. 2 illustrates a front side view partially cutaway of HC of FIG. 1 with a detail view of, according to one or more embodiments.

FIGS. 1-2 illustrate an example portable heating container 100 that operates off of a portable electrically rechargeable power source. With particular reference to FIG. 2, the portable heating container 100 includes a lower housing 102, which can be formed from molded plastic. In one or more embodiments, one or more handles 104 are attached to an exterior surface of lower housing 102. The exterior of the lower housing 102 includes a user control and indicator, such as a button 106 that turns on and off active components of the portable heating container 100. In an exemplary embodiment, the button 106 contains a Light Emitting Diode (LED) that indicates a device status such as: (i) on and warming; (ii) on and warmed to a set temperature; and (iii) off. The LED can be monochrome, bi-color, tri-color, or multi-color.

The lower housing 102 generally has a vessel shape that transitions to an upper housing 109 with an upper opening 110 with/an inwardly (downwardly) projecting cylindrical ring 112 having a bottom annular flange 114 extending horizontally and inwardly to narrow a circumference of the cylindrical ring 112. A generally circular lid 116 with an upward handle 117 has a downward cylindrical ring 118 extending from a circumference of a top disk 120. The downward cylindrical ring 118 of the lid 116 is received within the cylindrical ring 112 of the upper housing 109 and to rest upon the bottom annular flange 114. A bottom surface of the bottom annular flange 114 of the upper housing 109 includes an annular groove 122 that receives a corresponding snap fit ring 124 extending upwardly from an outer annular flange 126 surrounding a container 128. In one embodiment, the container 128 can be anodized aluminum and have an internal volume of 330 ml. An undersurface of the top disk 120 of the lid 116 can include an attachment feature to hold an eating utensil such as a spoon (not shown).

A heating element 130 warms the container 128. In one embodiment, the heating element 130 is thick film resistors that are in contact with an exterior of the container 128. A printed circuit board (PCB) 132 includes active functional components powered by batteries 134 that selectively power the heating element 130. In one embodiment, one or more batteries 134 are six (6) rechargeable lithium 18650 batteries that each can provide 3000 mAh of power. In one or more embodiments, the heating element 130 includes at least one metal oxide semiconductor field-effect transistor (MOSFET) sufficiently driven to generate heat.

A stirring element may be configured and disposed to mix a product or move around a product within the retainer. Examples of a stirring element include a stirring rod, a straw, a magnetic stirrer, a vibration unit, or other. In an exemplary embodiment, the Heating Container 100 may be provided with a stirrer (not shown) that may be coupled within the cavity of the heating container 100. The stirrer may be a mechanical/magnetic stirrer that may be activated by a switch (not shown). More specifically, the stirrer may be activated by the switch to facilitate stirring the fluid content in the heating container 100. In an alternate exemplary embodiment, the stirrer may be substituted with any type of agitator device known in the art that facilitates the fluid in the heating container 100 from attaining a homogenous constitution while maintaining uniform temperature. In an exemplary embodiment, the stirrer may be coupled to a controller. wherein the controller automatically stirs contents with the stirrer according to present parameters.

In an exemplary embodiment, the heating container 100 may be provided with a cooling element. A cooling element may be a refrigerant, ice unit, fan, or other cooling mechanism configured to decrease the temperature of the retainer, lid, product, or other contents of the retainer.

In an exemplary embodiment, the heating container 100 may be provided with a treatment element. A treatment element may include a filtering or other purifying element, flavor emitting element, fragrance emitting element, liquid conditioning element, cleaning element, or other treatment of the lid, retainer, product, or other contents of the retainer.

Certain embodiments of the system and methods of the present invention include one or more computer elements. Examples of computer elements include a processor, system memory, cache, system bus, chassis, fan, power source, basic input/output system (BIOS), hard disk drive, optical disk drive, non-transitory computer-readable medium, and USB or serial port. Certain embodiments of the present invention may include additional components. For example, embodiments of the present invention may include a power source, such as a battery, capacitor, flywheel, near-field inductance circuit, solar cell, generator (e.g., micro generator, thermoelectric generator, inductive generator, piezoelectric generator, etc.), or power plug (e.g., two prong, three prong, European standard). Embodiments of the present invention also may include a power distributor such as a lithium-ion power distributor.

Figure 3:
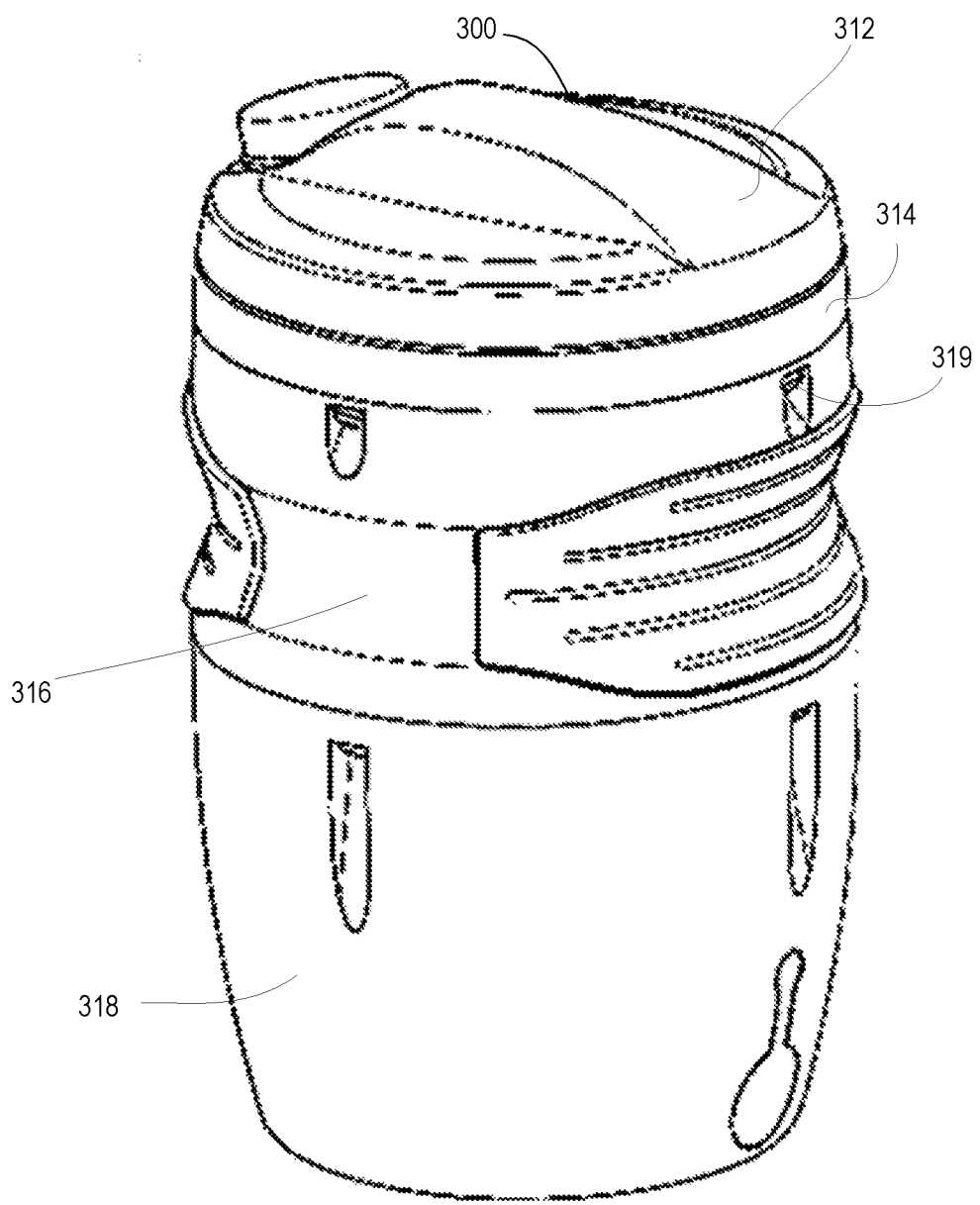
FIG. 3 illustrates an isometric view of an example portable food warmer having an integrally molded body, according to one or more embodiments.
Figure 4:
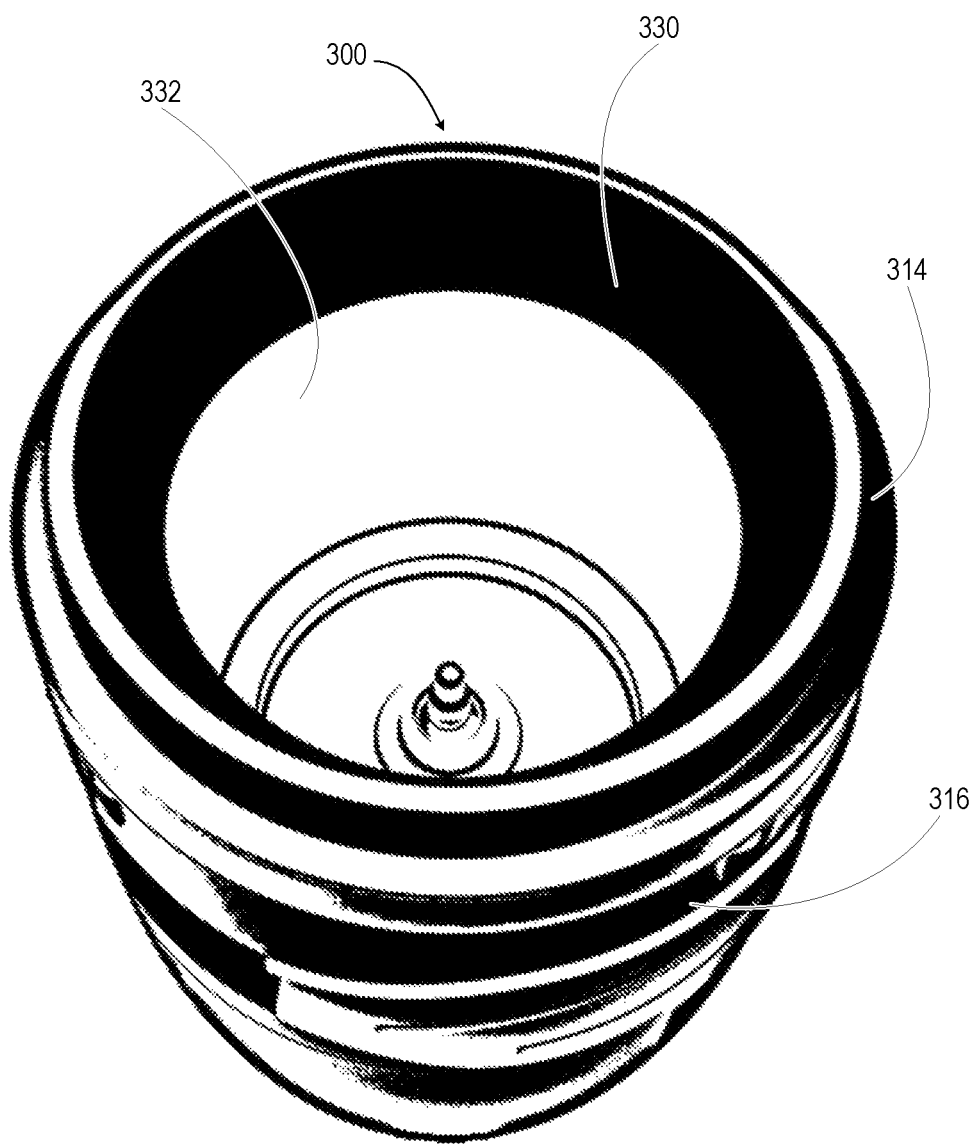
FIG. 4 illustrates a top isometric view of the example portable food warmer of FIG. 3 with a cap removed, according to one or more embodiments.
Figure 5:
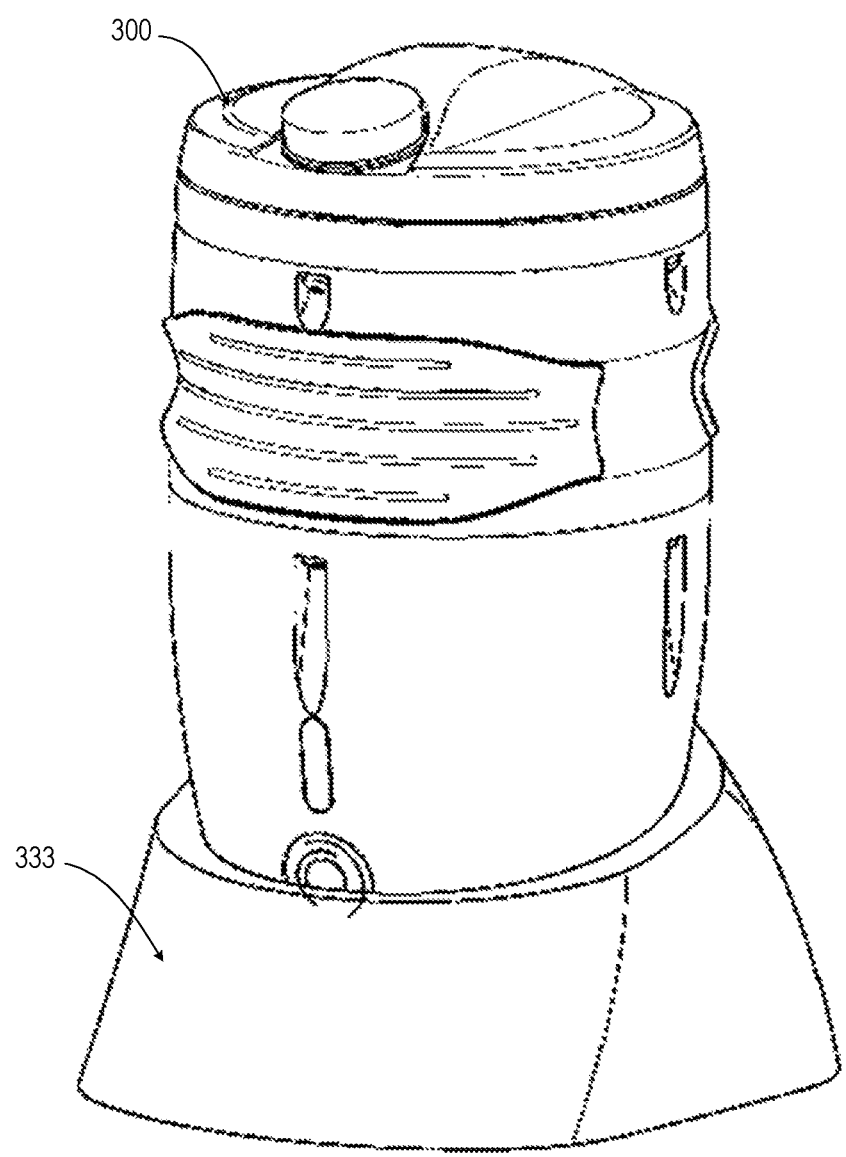
FIG. 5 illustrates an isometric view of the example portable food warmer of FIG. 3 inserted into a recharging receptacle, according to one or more embodiments.
Figure 6:
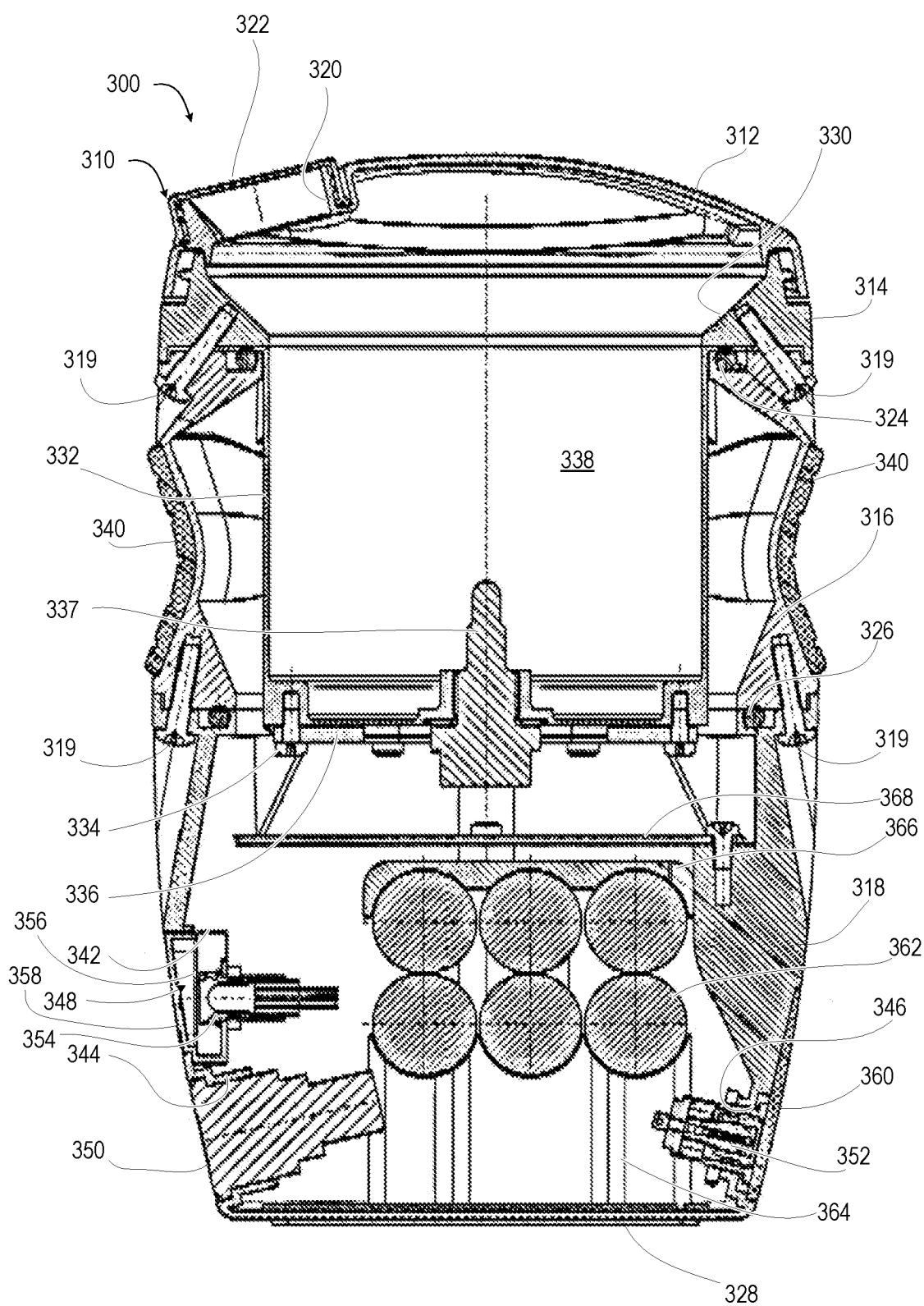
FIG. 6 illustrates a side cutaway view of the example portable food warmer of FIG. 3, according to one or more embodiments.

FIGS. 3-6 illustrate an exemplary portable food warmer 300 having an integrally molded body 302 that that is assembled with screws 304. FIG. 3 illustrates that the portable food warmer 300 includes molded parts that form an enclosure 310 including a cap 312, a top cover 314, a top housing 316, and a bottom housing 318, with all but the cap 312 secured together by M3.5×16 Taptite screws 319. FIG. 6 illustrates that the cap 312 has internal threads that engage external threads of the top cover 314. The cap includes a pour nozzle 320 that is closed by a pouring nose threaded cap 322. A top O-ring 82.00×4 324 seals the top cover 314 to the top housing 316. A bottom O-ring 92.00×4 326 seals the top housing 316 to the bottom housing 318. One or more rubber pads 328 cover a bottom surface of the bottom housing 318.

FIGS. 4 and 6 illustrate that the top cover 314 defines a funnel mouth 330 that transitions to a cylindrical inner container 332 attached inside the top housing 316 by six M3/×6 fasteners 334. FIG. 5 illustrates a recharge receptacle 333 that receives the portable food warmer 300. FIG. 6 illustrates that four heating resistors 336 are also secured to a bottom peripheral surface of the inner container 332. In a center of the bottom surface of the cylindrical container 332, a temperature sensor 337 extends into a vessel cavity 338 defined by the inner container 332, top cover 314 and cap 312. Two rubber side grips 340 are attached to opposing exterior sides of the top housing 316. Apertures 342, 344, 346 respectively in the bottom housing 318 receive a light emitting display (LED) display assembly 348, an LED control button 350, and a charging connector 352. The LED display assembly 348 includes an LED support 354 onto which is mounted an LED display 356. The aperture 342 is closed with an LED cover 358. In one or more embodiments, LED control button 350 is disposed upon the bottom housing 318 in a location and orientation providing easy access and clear visibility. In one or more embodiments, LED control button 350 serves as an on/off button permitting a user to provide power and to cut off power to portable food warmer 300.

Aperture 346 is closed by a charging connector rubber lid 360. Inside of the bottom housing 318, six 18650 rechargeable batteries 362 are supported between battery supports 364 and a battery cover 366. Above the battery cover 366, a printed circuit board (PCB) 368 is attached inside of the bottom housing 318 and contains functional controls of the portable food warmer 300.

Figure 7:
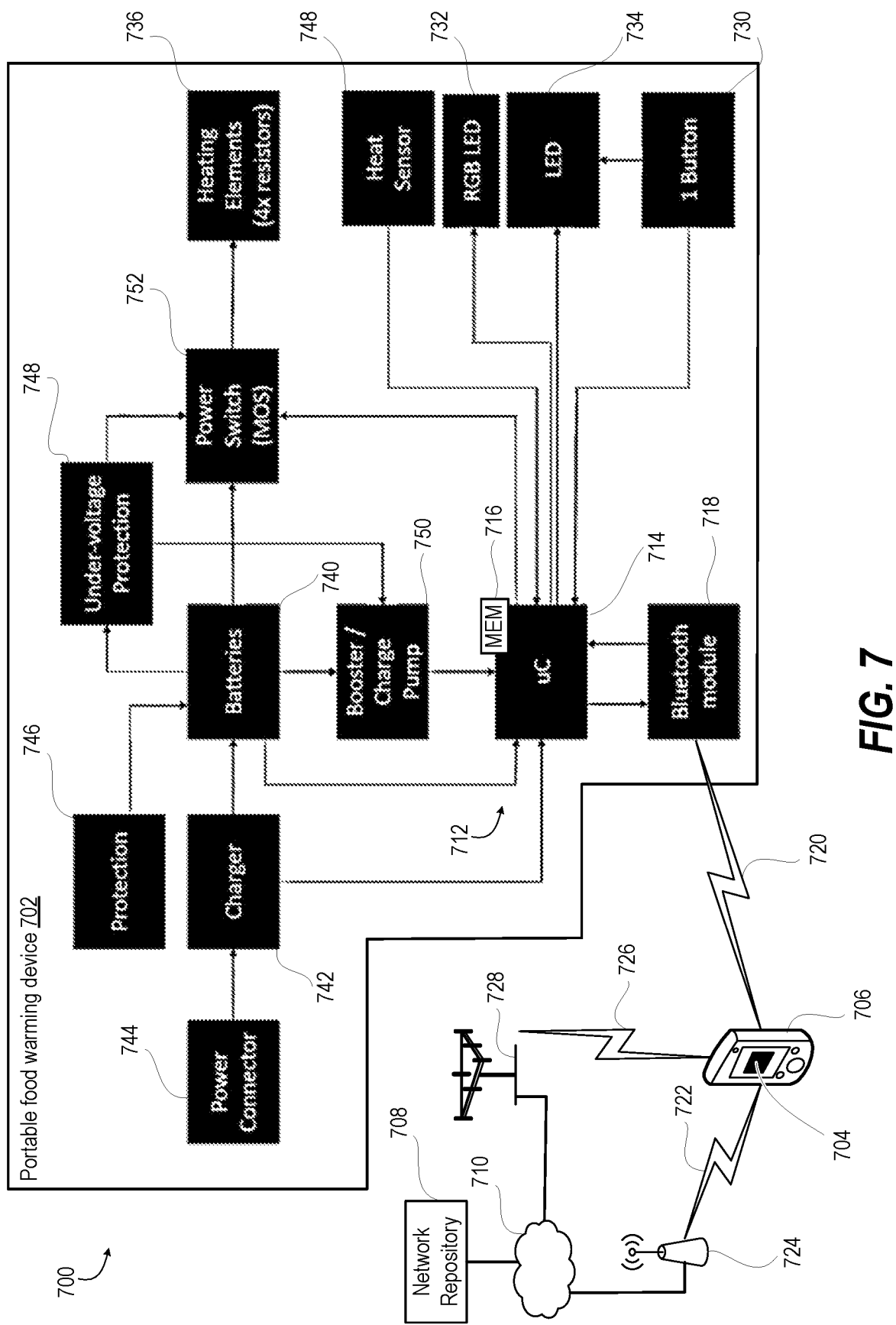
FIG. 7 illustrates a functional block diagram of a communication system including the portable food warmer, a smartphone, and a network repository, according to one or more embodiments.

FIG. 7 illustrates a communication system 700 including a portable product warming device 702 that communicates with a remote-control application 704 on a remote-control device such as a smartphone 706. The portable product warming device 702 either directly or through assistance from the smartphone 706 can access additional information from a network repository 708 over a network 710. Certain control functions can be exclusively provided on one of the portable product warming device 702 and the smartphone 706. Alternatively, certain control functions can be provided by both of the portable product warming device 702 and the smartphone 706. Centralized or distributed computing capabilities of the portable product warming device 702, the smartphone 706 and the network repository 708 can function together to operate as an information handling system (IHS) 712. For purposes of this disclosure, IHS 712, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

For clarity, IHS 712 includes a processor ("µC") 714 having a memory 112. Processor subsystem 110 may include any system, device, or apparatus configured to interpret and/or execute program instructions and/or process data, and may include, without limitation a microprocessor, microcontroller, digital signal processor (DSP), Application Specific Integrated Circuit (ASIC), or any other digital or analog circuitry configured to interpret and/or execute program instructions and/or process data such as an operating system. In some embodiments, processor 714 may interpret and/or execute program instructions and/or process data stored in memory 716 and/or another component of IHS 712. Memory 716 may be communicatively coupled to processor 712 and may include any system, device, or apparatus configured to retain program instructions and/or data for a period of time (e.g., computer-readable media). By way of example without limitation, memory 716 may include RAM, EEPROM, a PCMCIA card, flash memory, magnetic storage, opto-magnetic storage, or any suitable selection and/or array of volatile or non-volatile memory that retains data after power to IHS 712 is turned off or power to IHS 712 is removed. Network interface, such as a Bluetooth module 718 may include any suitable system, apparatus, or device operable to serve as an interface between IHS 712 and smartphone 706 or network 710. For example, IHS 712 can include a personal access network (PAN) 720 between the portable product warming device 702 and the smartphone 706. The smartphone 706 can include a wireless local access network (WLAN) link 722 to a node 724 that in turn is communicatively coupled to the network 710. Alternatively, or in addition, the smartphone 706 can communicatively couple over a wireless wide area network (WWAN) link 726 such as via cellular communication to a radio access network (RAN) 728. IHS 712 can communicate using any suitable transmission protocol and/or standard, including without limitation all transmission protocols and/or standards enumerated herein with respect to the discussion of network 710. The term "communications network" can include the Internet as manifested by the World Wide Web (WWW) of computers, and to Intranets or Extranets or any other open or closed communications networks, including GSM and GPRS cellular networks, satellite networks, cable networks and local area networks, either wired or wireless.

Processor 712 can receive control inputs from a single control button 730 and provide status indications on a red green blue (RGB) light emitting diode (LED) 732. Processor 712 can also interact with inputs or outputs provided via an LED display 734. Processor 712 can provide closed loop control of heating elements 736 by monitoring a heat sensor 738 that includes measurement circuit that measures the container temperature using a thermistor or a temperature sensor. The heat sensor 738 can be for example a thermocouple-based or thermoresistive-based or thermistor-based sensor or any other system allowing the measuring of a temperature connected to the circuit. Batteries 740 that power the heating elements 736, RGB LED 732 and LED display 734 are charged by a charger 742 that receives power from a power connector 744. A protection circuit 746 prevents overcharging of the batteries 740. An under-voltage protection circuit 748 controls a booster/charge pump 750 to maintain a voltage level that is satisfactory for powering the processor 714. The processor 714 triggers a metal oxide silicon (MOS) power switch 752 that receives power from the batteries and under-voltage protection circuit 748 to cause power to flow to the heating elements 736.

Processor 714 executes software that performs functions such as: (i) verifies that all the conditions are fulfilled in order to start the device when the button is pressed; (ii) opens the power supply circuit through transistor; (iii) indicates the device status using a LED; and (iv) stops the device when the desired temperature is reached.

Processor 714 can participate in communication of data relating to liquids and/or foods via the communications network 700. IHS 712 is preferably equipped for both sending and receiving data related to formula and/or fluid foods and is capable of receiving input related to the preparation of a liquid or food using an available formula from a remote source and will similarly be capable of providing user output to a remote source.

Accordingly, device 100 is preferably provided with one or more of a range of communication apparatus that allows device 100 to communicate directly through either a hard-wire communication mode (e.g., dial-up, LAN, or WAN) or a wireless communication mode (e.g., infrared or radio frequency) or a combination thereof. Device 100 can include a Wi-Fi, BLUETOOTH chip, or any other wireless solution that will enhance its versatility and mobility, allowing it, for example, to access the Internet from a plurality of access points. For purposes of such communication, device 100 preferably includes either or both a wired communications port and a wireless communications port.

It will be appreciated that the list of user client types, the list of devices that constitute a computer and the list of communications networks are not to be regarded as limiting. Further embodiments of device 100 may adopt all emerging technology to communicate in every way and with every device that advances its function.

Figure 8:
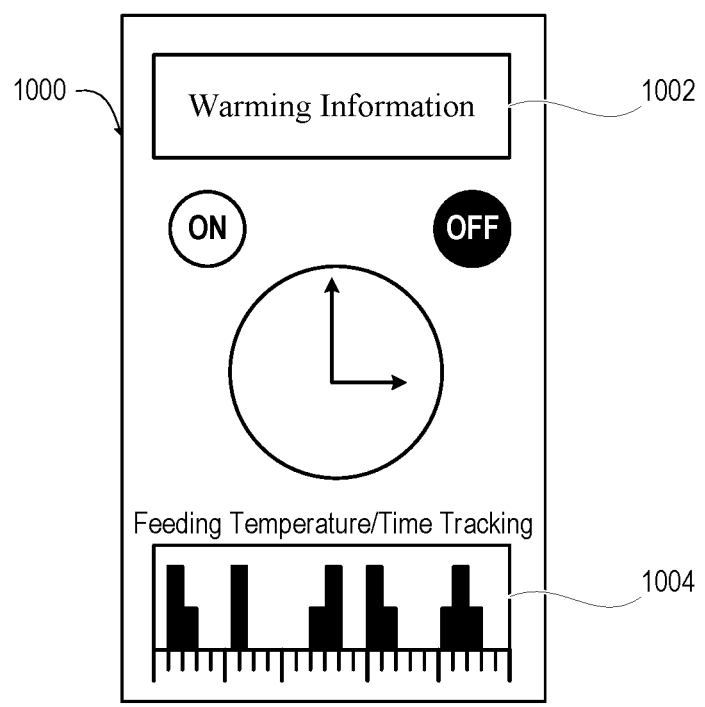
FIG. 8 illustrates a diagram of an example user interface for the portable food warmer, according to one or more embodiments.

FIG. 8 illustrates an example user interface 1000 that is displayed on at least one of the LED display 734 (FIG. 7) or the smartphone 706 (FIG. 7). Information 1002 related to the food or recipient that is retrieved from a remote source can be displayed. Historical feeding data 1004 that is tracked can be displayed to assist a user. The user interface 1000 can enable a user to do functions such as: (a) Set temperature and adjust; on/off; log parameters; (b) Alarms and/or logging of feeding times and amounts; (c) Pull articles from web sites to share information; (d) Input articles (upload) for others; and (e) Get advice/tips.

It is understood that the user interface 1000 depicted is solely exemplary and is so depicted to show representative features that may be included in any interface 1000 provided in the various embodiments of which portable product warming device 300 (FIG. 3) is capable. Therefore, it is understood that embodiments of portable product warming device 300 (FIG. 3). need not have every one of the features and elements shown and may have additional features and elements not shown. Moreover, the features and elements shown may be arranged in any convenient or esthetically pleasing design including being located separately in different locations.

Figure 9:
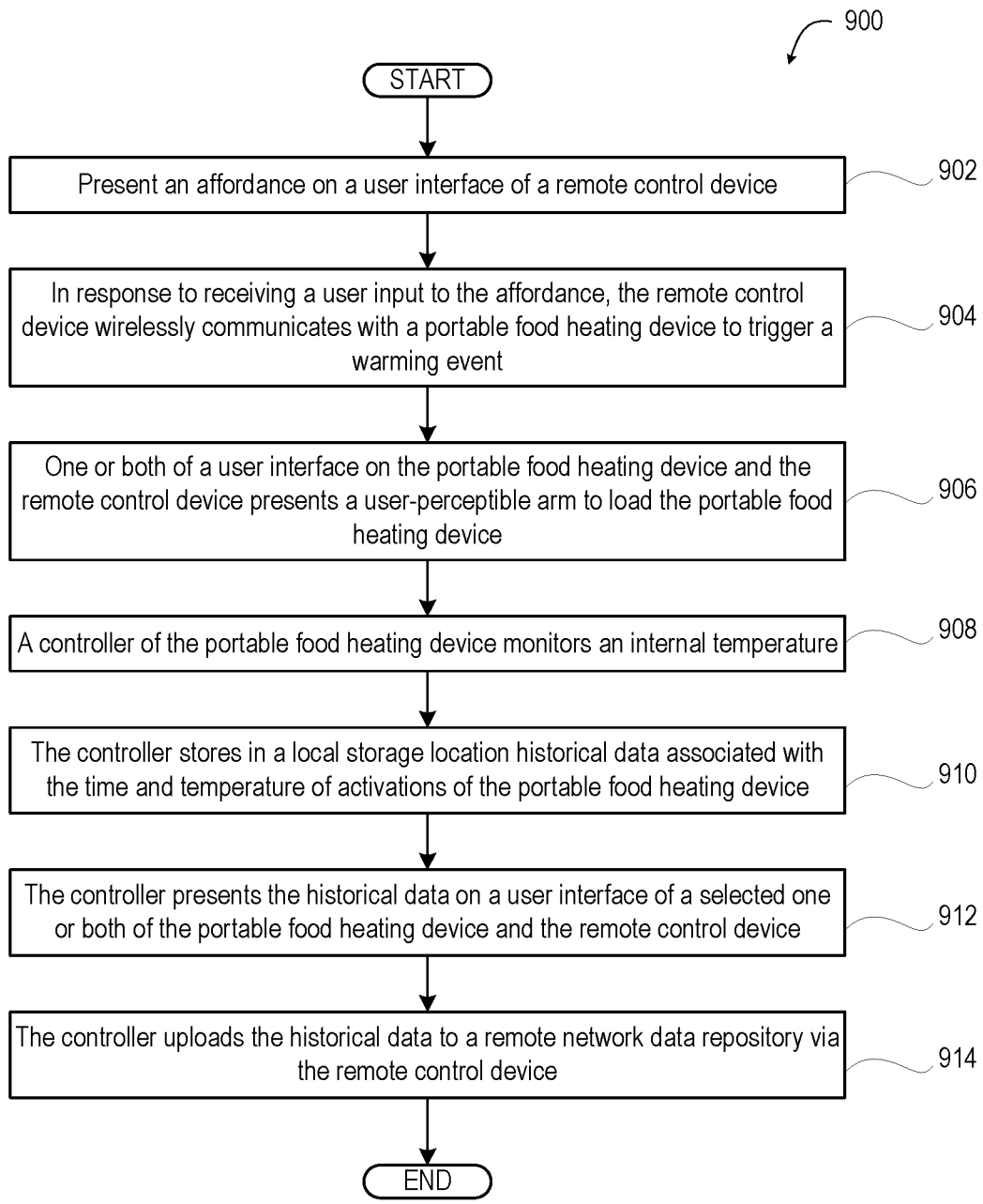
FIG. 9 illustrates a flow diagram of a method of remote control of a portable food warming apparatus, according to one or more embodiments.

FIG. 9 illustrates a method 900 of remote control of a portable food warming apparatus. In one or more embodiments, the method 900 includes presenting an affordance on a user interface of a remote-control device (block 902). In response to receiving a user input to the affordance, the remote-control device wirelessly communicates with a portable food heating device to trigger a warming event (block 904). One or both of a user interface on the portable food heating device and the remote-control device presents a user-perceptible arm to load the portable food heating device (block 906). A controller of the portable food heating device monitors an internal temperature (block 908). The controller stores in a local storage location historical data associated with the time and temperature of activations of the portable food heating device (block 910). The controller presents the historical data on a user interface of a selected one or both of the portable food heating device and the remote-control device (block 912). The controller uploads the historical data to a remote network data repository via the remote-control device (block 914).

Figure 10:
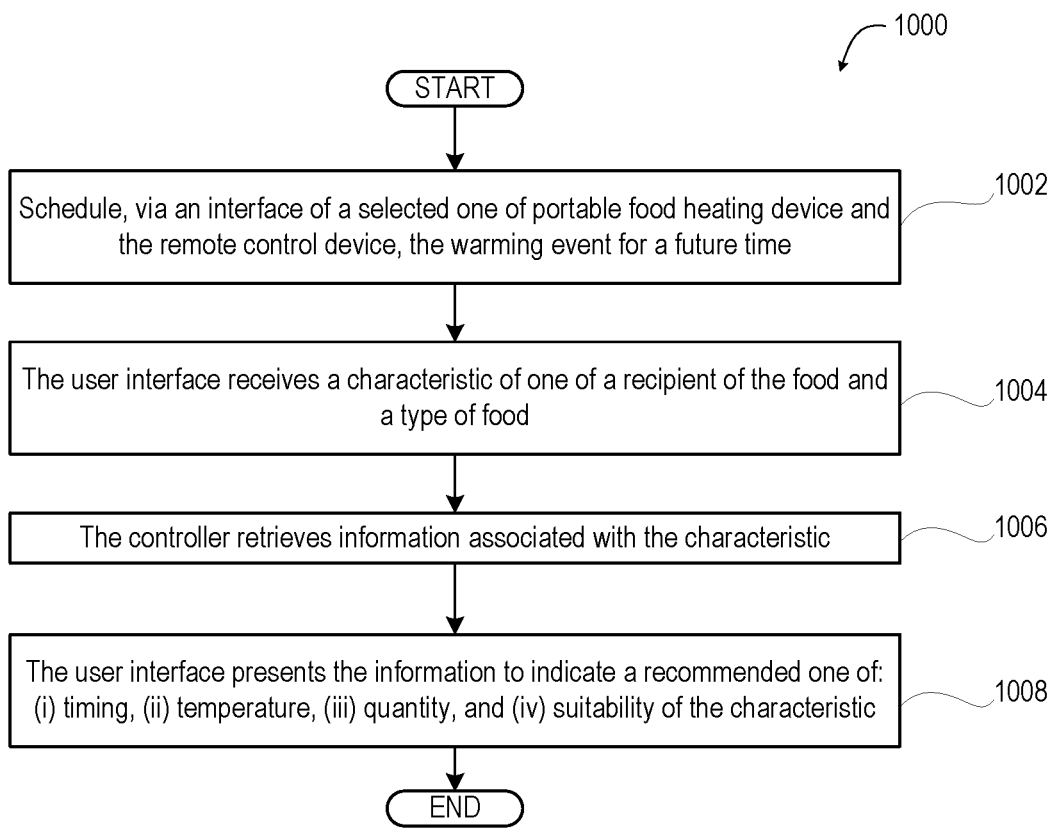
FIG. 10 illustrates a flow diagram of a method of scheduled and guided food warming for an intended recipient such as a child having specific feeding requirements, according to one or more embodiments.

FIG. 10 illustrates a method 1000 of scheduled and guided food warming for an intended recipient such as an infant or a child having specific feeding requirements. The method 1000 can be performed by the equipment described in FIGS. 1-9. In one or more embodiments, the method 1000 includes scheduling, via an interface of a selected one of portable food heating device and the remote-control device, the warming event for a future time (block 1002). The user interface receives a characteristic of one of a recipient of the food and a type of food (block 1004). The controller retrieves information associated with the characteristic (block 1006). The user interface presents the information to indicate a recommended one of: (i) timing, (ii) temperature, (iii) quantity, and (iv) suitability of the characteristic (block 1008). In one or more embodiments, the remote user device or remote-control device comprises a camera and a scanning utility that reads identifying indicia on the packaging of a food product. The user interface communicates with the network data repository to associate the identifying indicia with the food. The controller associates the information retrieved with the food.

In a still further alternative embodiment of the container warmer of the present invention, the device can be sized and shaped to accommodate a motor vehicle cup-holder for incorporation in motor vehicles either as original equipment or, alternately, for later installation, which could accommodate the HC of the present invention, and comprise means to supply electric power to the container warmer, and also to recharge the battery if the container warmer comprises a rechargeable battery. This latter embodiment would have the advantage of using the motor vehicle's electrical system to keep the food or liquid at optimum temperature for consumption, and keeping the battery unit fully charged, while the user is in the motor vehicle, while at the same time affording portability, allowing the user to take the HC out of the motor vehicle and still maintain proper temperature.

In another alternative embodiment, the HC of the present invention could be fabricated in the form of a container holder detachably attached to a portable computer, and comprising electrical heating means powered by the portable computer's battery or line-voltage power. Such embodiment would provide the advantage of keeping the computer user's food or beverage at optimum temperature while using the computer in airports, airplanes, busses or trains, etc.

Many of the embodiments described above incorporate batteries as sources of electric power. The inventors of the present invention are aware that miniature fuel cells are currently under development which could conceivably replace batteries at some time in the future in many applications requiring stored electric power. The present invention contemplates the use of such miniature fuel cells as an alternate for batteries to supply the necessary electric power to operate the HC of the present invention.

Device 100 is designed to be programmable and to both provide a user with data and information and also to accept input from a user to decide the composition, quantity and temperature of the fluid or food to be prepared.

In one or more embodiments, interface 620 includes a visual display 630 that serves as an output interface. Device 100 communicates with a user via display 630 that is preferably an LCD monochrome or color display screen capable of showing text. It is appreciated that alternate embodiments may be capable of showing graphics and still or moving graphic and photographic images. It is further appreciated that future embodiments may have screens of larger or smaller dimensions, capable of displaying more or less or different types of data. Interface 620 may also include an auditory output interface (not shown), such as an integral speaker, for providing audible signals such as alerts, warnings or information regarding certain conditions that prevail, such as low water levels and the like.

Device 100 may also, in alternate embodiments, use a remote computing device as an input interface and be used for the input of data. For example, the device can communicate with a mobile device application via Bluetooth® connectivity. According to an alternate embodiment, remote computing device display 630 could include a touch sensitive digitizer pad that can detect contact by any type of pointer, from a stylus to a simple finger touch. Through such a touch sensitive display 630, interface 620 could input data in a number of different modes. First, it could display a virtual and touch functional keyboard. In order to key in data, the user touches display 630 on the desired key of the keyboard and the character of that key appears in the open field. Display 630 could display scrolling or windows-like data menus from which alternatives are selectable by touch. Thus, display 630 could allow entry of data by touch selecting the desired data from displayed lists or menus. Display 630 could serve as a sensor for character recognition that recognizes a tracing and replaces the recognized character with a legible and easily identifiable version in the desired location.

According to the preferred embodiment, the primary input capabilities of interface 620 will be via one or more finger-pressable buttons. It is understood that the following description of the use, function and designation of the buttons is solely exemplary and any configuration, combination or marking of buttons that effect the functioning of device 100 may be used.

Interface 630 includes a plurality of function selection buttons, referred to hereinafter in the aggregate as buttons 634. Pressing each button with a fingertip or other object will cause the relevant function to be activated. Accordingly, interface 630 will display information or data related to the function selected and will accept input related thereto.

It will be appreciated that the number, configuration, location and function of all of the input and output components of interface 630 are not critical elements of the design of user interface 630 nor of device 100 and further embodiments may deploy these components in various ways, including the inclusion of jacks and ports comprising open architecture whereby remote input and output devices may be employed.

MOX: Heating Technology: MOX heating system is composed from two (2) electronic metal oxide silicon field effect transistors (MOSFETs) that is fabricated by the controlled oxidation of a semiconductor, typically silicon. Each MOSFET has an insulated gate, whose voltage determines the conductivity of the device. This ability to change conductivity with the amount of applied voltage can be used for amplifying or switching electronic signals. The present innovation contemplates using MOSFETs in a novel fashion.

Usual MOSFET application: A common use of MOSFETs in analog circuits is the construction of differential amplifiers, used as input stages in operational-amplifiers, video amplifiers, high-speed comparators, and many other analog circuits. Discrete MOSFET devices are widely used in applications such as switch mode power supplies, variable-frequency drives and other power electronics applications where each device may be switching thousands of watts. Radio-frequency amplifiers up to the ultra-high frequency (UHF) spectrum use MOSFET transistors as analog signal and power amplifiers. Radio systems also use MOSFETs as oscillators, or mixers to convert frequencies. MOSFET devices are also applied in audio-frequency power amplifiers for public address systems, sound reinforcement and home and automobile sound systems. In these generally-known applications, overheating is a major concern in integrated circuits since ever more transistors are packed into ever smaller chips. Almost in all MOSFET applications, overheating of MOSFETs should be avoided, because the MOSFETs are damaged or destroyed by overheating.

MOSFET heating technology: The present innovation contemplates using MOSFET heating, which is counter intuitive because overheating of MOSFETs is usually avoided. The overheating of the MOSFET is performed in a controlled way. The generated heat from the MOSFETs is transferred to the aluminum container and to the liquid in the aluminum container.

The present innovation recognizes advantages of using MOSFETs for heating technology: (i) MOSFETs are easy to mount on printed circuit boards (PCBs) and to a metal container; (ii) power adjustments are achievable by changing a single resistor on the PCB; (iii) MOSFETs have a low to moderate price; (iv) MOSFETs have low thermal inertia, enabling quick activation and deactivation; and (v) The output power of MOSFETs drops linearly with battery voltage.

The present innovation contemplates and addresses possible drawbacks in using MOSFET's as heating technology: (i) MOSFET's have no galvanic isolation, and needs more attention to create a safe design which covers all technical scenarios; (ii) Heating with MOSFET's requires good thermal contact for thermal conduction; and (iii) and additional driver circuit protection to keep MOSFETs on the limit of safe operating area (SOA) of voltage and current conditions to heat without damage.

Prototype investigation by the Applicant validated MOSFET heating technology over alternative approaches. First, Kanthal heating technology was tried. Kanthal is the trademark for a family of iron-chromium-aluminium (FeCrAl) alloys used in a wide range of resistance and high-temperature applications. Kanthal FeCrAl alloys consist of mainly iron, chromium (20-30%) and aluminum (4-7.5%). The first Kanthal FeCrAl alloy was developed by Hans von Kantzow in Hallstahammar, Sweden. The alloys are known for their ability to withstand high temperatures and having intermediate electric resistance. As such, it is frequently used in heating elements. The trademark Kanthal is owned by Sandvik Intellectual Property AB.

Since Kanthal is not solderable, achieving satisfactory physical attachment and thermal contact to the PCB is difficult. In addition, a disadvantage of Kanthal heating technology is that heating power drops exponentially with battery voltage. Another disadvantage is that is hard to control output power, because it is given by the length of the Kanthal wire. Kanthal does have advantages of being cheap, requiring a simple driving circuit, and is physically robust.

Second, resistor heating technology is invested, which can be described as a bulky power capsule. The resistors, due to the big aluminum housings, have high thermal inertia. Additional assembly step is required to connect the resistors to PCB. Resistors must be fixed and connected together individually also, which is time consuming for the assembly process. A disadvantage of this heating technology is that heating power drops exponentially with battery voltage. Another disadvantage is that is hard to control output power using the already mounted resistor values. Resistive heating is also cheap, requires a simple driving circuit, and is physically robust.

Third, another resistor heating technology, TO-220 capsule, was investigated. This is the most expensive heating technology of those technologies that were analyzed. The TO-220 is a style of electronic package used for high-powered, through-hole components with 0.1 inches (2.54 mm) pin spacing. The "TO" designation stands for "transistor outline". TO-220 packages have three leads. Similar packages with two, four, five or seven leads are also manufactured. A notable characteristic is a metal tab with a hole, used in mounting the case to a heatsink, allowing the component to dissipate more heat than one constructed in a TO-92 case. Common TO-220-packaged components include discrete semiconductors such as transistors and silicon-controlled rectifiers, as well as integrated circuits.

Additional assembly step is required to connect the resistors to the PCB, resistors must be fixed and connected together individually also, which is time consuming for the assembly process. A disadvantage of this heating technology is that heating power drops exponentially with battery voltage. Another disadvantage is that is hard to control output power, by the already mounted resistor values. Advantages of this technology is a simple driving circuit, physically robust, easy to mount on a PCB and a metal container, and has low thermal inertia.

Figure 11:
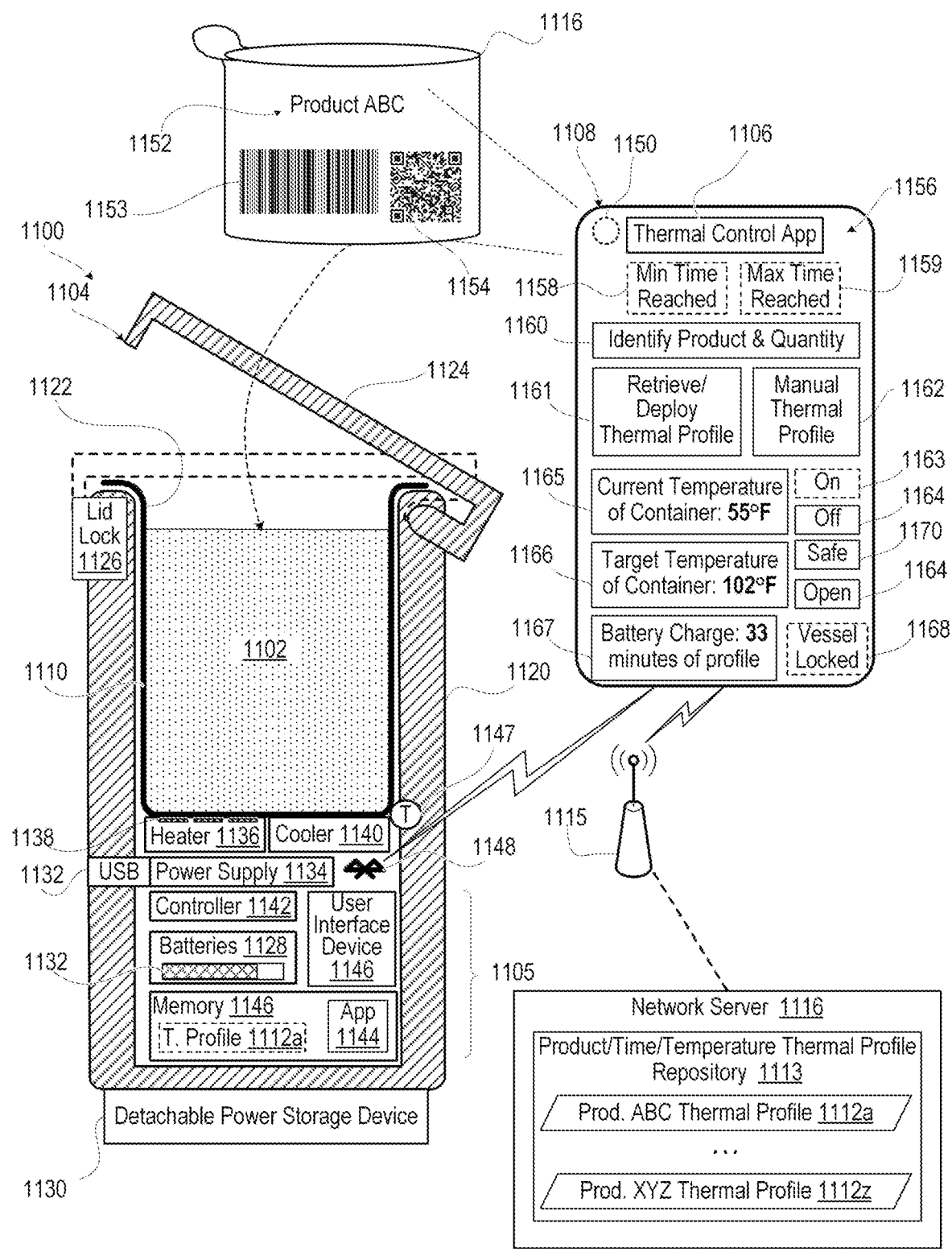
FIG. 11 depicts a portable product heating system that automatically manages a temperature profile that is particular to a type and quantity of a product placed in the portable product thermal system to ensure safe use, according to one or more embodiments.

FIG. 11 depicts a portable product heating system 1100 that automatically manages a temperature profile that is particular to a type and quantity of a product 1102 placed in the portable product thermal system 1100 to ensure safe use. The portable product thermal system 1100 includes one component or multiple components that are communicatively coupled to automatically determine and execute customized heating and/or cooling profiles for a range of selectable products 1102. In one or more embodiments, the portable product thermal system includes a portable thermal device 1104 having integrated controls 1105 that are augmented by downloading and executing a thermal control application ("app") 1106 on a communication device such as a smartphone 1108. The thermal control app 1106 enables the smartphone 1108 to automatically identify the type and quantity of the product 1102 put into an at least partially thermally conductive container 1110 of the portable thermal device 1104. Based on the type and quantity of the product 1102, the thermal control app 1106 enables the smartphone 1108 to automatically identify an appropriate thermal profile 1112 for preserving, preparing and using the product 1102. In one or more embodiments, the thermal profile 1112 of more than one thermal profile 1112 is pre-provisioned on the portable thermal device 1104. In one or more embodiments, the thermal profile 1112a of more than one thermal profile 1112a-1112z is pre-provisioned on the smartphone 1108 as part of installing the thermal control app 1106. In one or more embodiments, the thermal profile 1112 of more than one thermal profile 1112 is maintained in a product/time/temperature thermal profile repository 1113 on a remote network server 1114 that is accessed by the smartphone 1108 via a node 1115. For example, a maker or distributer of the product 1102 can identify a network location for information associated with proper or preferred use of the product 1112. In one or more embodiments, the thermal profile 1112 is encoded on packaging 1116 of the product 1102. In one or more embodiments, the packaging 1116 is made of materials suitable for undergoing the thermal profile 1112a and is sized for insertion into the container 1110 of the portable thermal device 1104.

In one or more embodiments, the portable thermal device 1104 further includes an insulative housing 1120 having an opening 1122. The thermally conductive container 1110 is received in the housing 1120 and is accessible through the opening 1122. In one or more embodiments, a closure is provided to seal the opening 1122. In one or more embodiments, the closure is a pivoting lid 1124 that is movable between an open position and a closed position. An electrically-actuated lid lock 1126 can prevent access to the product 1102 when not deemed safe, such as too hot or prior to being sterilized.

One or more power storage devices, such as batteries 1128, are contained in the housing 1120. Other power storage devices such as a fuel cell or other detachable power storage devices 1130 can also be incorporated. A stored power sensor 1132 can sense an amount of electrical charge or fuel contained in the batteries 1128 or detachable power storage devices 1130 for managing the thermal profile 1112a or for alerting a user for a need to recharge the portable thermal device 1104. In one or more embodiments, the portable thermal device 1104 is recharged via a power interface, such as a universal serial bus (USB) port 1132 that is electrically connected to a power supply 1134. In one or more embodiments, the USB port 1132 provides external access to the stored power of the portable thermal device 1104 for use by a peripheral device. The power supply 1134 charges the batteries 1128, powers the integrated controls 1105, and powers thermal elements such as a heater 1136 that uses MOSFETs 1138 and/or an electrical cooling component 1140. The integrated controls 1105 includes a controller 1142, such as processor, that executes a thermal control application 1144 contained in a memory 1146 that is provisioned with the thermal profile 1112a. Closed loop control of temperature is based on one or more temperature sensors 1147 that are positioned to detect the temperature of the product 1102 in the container 1110. The thermal control application 1144 can be the same as the thermal control app 1106, can be a master application to the thermal control app 1106 that is a client application, or can be a client application to thermal control app 1106 that is a client application. The integrated controls 1105 includes a user interface device 1146, which can be switches and light indicators as described above or perform some or all of the functionality described herein as provided by the smartphone 1108. The integrated controls 1105 includes network interface, depicted as wireless transceiver 1148 such as an IEEE 802.1 transceiver or personal access network transfer (e.g., Bluetooth).

In one or more embodiments, the thermal control app 1106 enables the smartphone 1108 to scan the packaging 1116 of the product 1102. For example, a camera 1150 of the smartphone 1108 is used to perform optical character recognition of alphanumeric information or codes 1152 on the packaging 1115. For another example, the camera 1150 of the smartphone 1108 is used to perform a scan a one-dimensional barcode 1153 on the packaging 1115. For an additional example, the camera 1150 of the smartphone 1108 is used to perform a scan a two-dimensional barcode 1154 on the packaging 1115. In one or embodiments, the camera 1150 is used to measure the volume of the packaging 1115 to estimate the quantity of the product 1102. A user interface device 1156 of the smartphone 1108 can be used to present information related to the product 1102, the thermal profile 1112a associated with the product 1102, or information related to execution of the thermal profile 1112a by the portable thermal device 1104. As a non-inclusive example, the user interface device 1156 can present a minimum time indication 1158 as to whether a minimum preparation time has elapsed for the thermal profile 1112a to prepare the product 1102 for use. The user interface device 1156 can present a maximum time indication 1159 as to whether product 1102 has been in a particular temperature range or has been removed from the packaging 1116 for too long. The user interface device 1156 can present identification information 1160 for the product 1102 and quantity of the product 1102. The user interface device 1156 can present a user control 1161 to automatically retrieve and deploy the thermal profile 1112a. The user interface device 1156 can present a user control 1162 to receive manual entry of the thermal profile 1112a. The user interface device 1156 can present a user control 1163 to activate the thermal profile 1112a. The user interface device 1156 can present a user control 1164 to deactivate the thermal profile 1112a. The user interface device 1156 can present a user control 1164 to override the lid lock 1126. The user interface device 1156 can present current temperature information 1165 and target temperature information 1166 according to the thermal profile 1112a. The user interface device 1156 can present calculated time limit information 1167 before recharge is required based on one or more of: (i) type of product 1102; (ii) quantity of product 1102; (iii) current temperature; (iv) temperature profile as a function of time; and (v) amount of stored power. The user interface device 1156 can present a lock status indication 1168. The user interface device 1156 can present a product safety indication 1170 of whether the product 1102 has been maintained in a temperature range for a period of time that avoids degradation or risk of injury due to an extreme temperature.

These indications can be related to particular thermal profiles 1112a-1112z. For example, a maximum temperature or a lower temperature range can be required to preserve the product 1102 for a period of time. The thermal profile 1112a-1112z can include a time range and a temperature range required to prepare the product 1102, such as to sterilize the product 1102 or create a chemical change such caramelization. The thermal profile 1112a-1112z can include a time range and a temperature range for use of the prepared product 1102. For example, the product 1102 can be a food or beverage that is has a temperature range associated with being safe to consume and a narrower temperature range associated with being more gratifying to consume.

Figure 12:
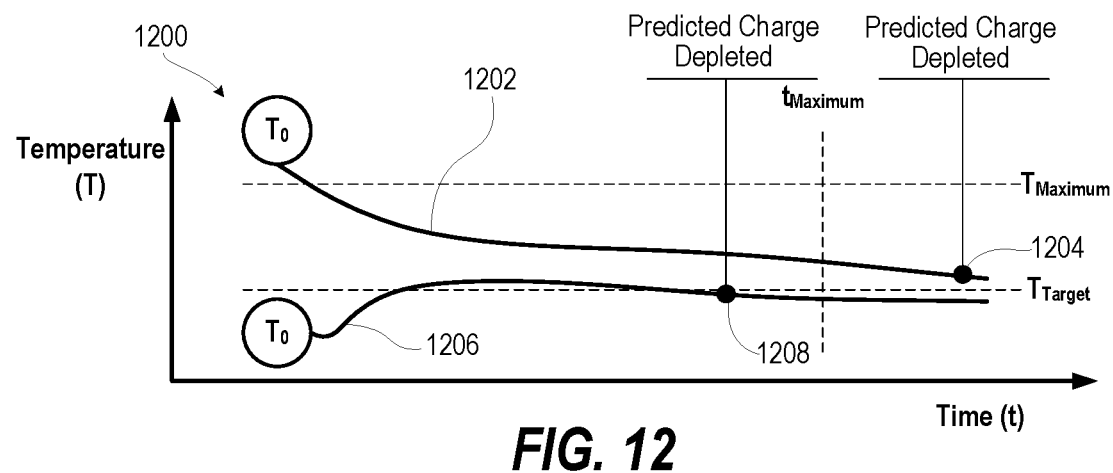
FIG. 12 is a graphical plot of time versus temperature for executing a particular thermal profile with two starting temperature conditions, according to one or more embodiments.

FIG. 12 is a graphical plot 1200 of time versus temperature for executing a particular thermal profile with two starting temperature conditions. Temperature trace 1202 is for an initial temperature $T_0$ that is greater than a maximum temperature for safety, such as newly brewed hot tea or coffee. The portable thermal device 1100 (FIG. 11) can indicate when the temperature reduces to be within a safe temperature range for consumption, perhaps locking the portable thermal device 1100 (FIG. 11) until below the maximum temperature threshold. In one or more embodiments, the temperature is allowed to dissipate without active cooling, conserving stored power. The portable thermal device 1100 (FIG. 11) can predict a time limit 1204 for when recharging will be required based on maintaining a target temperature. Temperature trace 1206 is for another scenario for a product 1102 (FIG. 11) that has an initial temperature $T_0$ that is less than the target temperature. The portable thermal device 1100 (FIG. 11) can predict a time limit 1208 that is less than the prior time limit 1206 for when recharging will be required based on maintaining a target temperature. In one or more embodiments, the portable thermal device 1100 (FIG. 1) determines whether or not the product includes something like a dairy creamer that has a limited time after dispensing for consuming and provides an indication when this maximum time $t_{maximum}$ is exceeded.

Figure 13:
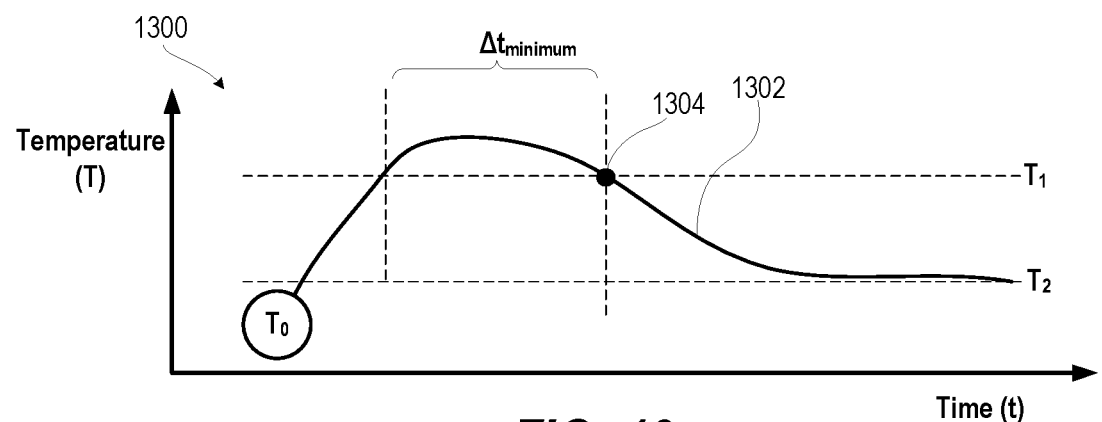
FIG. 13 is a graphical plot of time versus temperature for executing a particular thermal profile that requires an initial higher temperature $T_1$ followed by a lower temperature $T_2$, according to one or more embodiments.

FIG. 13 is a graphical plot 1300 of time versus temperature for executing a particular thermal profile that requires an initial higher temperature $T_1$ followed by a lower temperature $T_2$. For example, the product 1102 (FIG. 11) can be tap water that is insufficiently chlorinated for safe consumption. The thermal profile includes heating the product 1102 (FIG. 11) to be above the higher temperature $T_1$ for a minimum period of time to sterilize the tap water. Then, the product 1102 (FIG. 11) is actively or passively cooled to the lower temperature $T_2$ for use or consumption.

Figure 14:
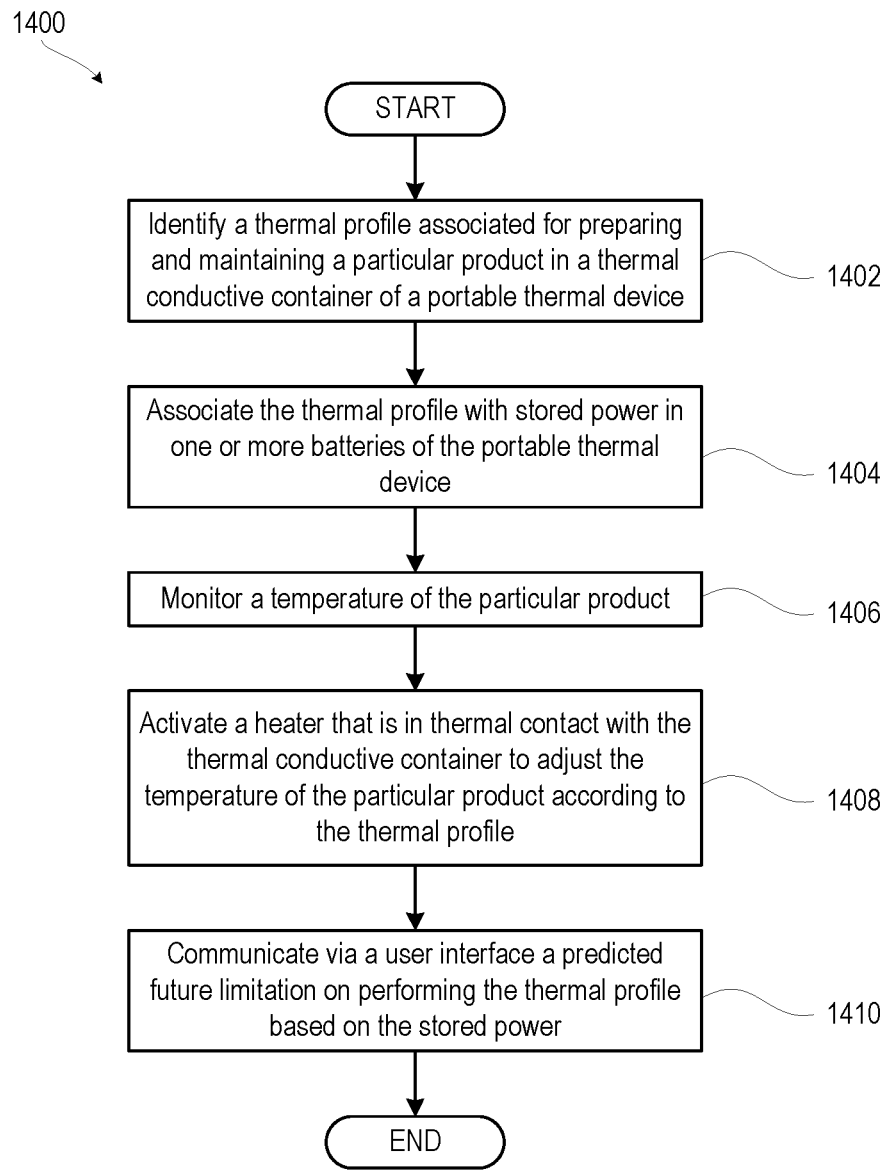
FIG. 14 presents a flow diagram of a method of operating a portable thermal device, according to one or more embodiments.

FIG. 14 presents a flow diagram of a method 1400 of operating a portable thermal device. In one or more embodiments, the method 1400 is performed by components described above for FIGS. 1-13 such as the portable product heating system 1400 (FIG. 14). Method 1400 includes identifying a thermal profile associated for preparing and maintaining a particular product in a thermal conductive container of a portable thermal device (block 1402). Method 1400 includes associating the thermal profile with stored power in one or more batteries of the portable thermal device (block 1404). Method 1400 includes monitoring a temperature of the particular product (block 1406). Method 1400 includes activating a heater that is in thermal contact with the thermal conductive container to adjust the temperature of the particular product according to the thermal profile (block 1408). Method 1400 includes communicating via a user interface a predicted future limitation on performing the thermal profile based on the stored power (block 1410). Then method 1400 ends.

In one or more embodiments, method 1400 includes activating the heater by driving current through one or more metal oxide semiconductor field-effect transistors (MOSFETs) in a range sufficient to generate heat without damaging the MOSFETs.

In one or more embodiments, method 1400 includes determining the quantity and initial temperature of the particular product; and predicting the future time limitation on performing the thermal profile based at least in part on the quantity and the initial temperature of the particular product.

In one or more embodiments, method 1400 includes scanning indicia on packaging of the particular product for identifying information; and identifying the thermal profile based on the identifying information.

In one or more embodiments, method 1400 includes: (i) determining a safety limitation defined by a maximum time within a pre-defined temperature range that is associated with the thermal profile; (ii) monitoring the amount of time that the particular product is within the pre-defined temperature range; and (iii) presenting an indication via the user interface device in response to the amount of time exceeding the maximum time. In a particular embodiment, method 1400 includes preventing access to the particular product in the thermally conductive container in response to the amount of time exceeding a maximum time.

In one or more embodiments, method 1400 includes: (i) determining a safety limitation defined by a minimum time within a pre-defined temperature range that is associated with the thermal profile; (ii) monitoring the amount of time that the particular product is within the pre-defined temperature range; and (iii) presenting an indication via the user interface device in response to the amount of time being less than the minimum time. In a particular embodiment, method 1400 includes preventing access to the particular product in the thermally conductive container in response to the amount of time being less than the minimum time.

All publications, patents and patent applications cited herein, whether supra or infra, are hereby incorporated by reference in their entirety to the same extent as if each individual publication, patent or patent application was specifically and individually indicated as incorporated by reference. It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

It must be noted that, as used in this specification and the appended claims, the singular forms "a," "an" and "the" include plural referents unless the content clearly dictates otherwise. Thus, for example, reference to a "colorant agent" includes two or more such agents.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

As will be appreciated by one having ordinary skill in the art, the methods and compositions of the invention substantially reduce or eliminate the disadvantages and drawbacks associated with prior art methods and compositions.

It should be noted that, when employed in the present disclosure, the terms "comprises," "comprising," and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

While it is apparent that the illustrative embodiments of the invention herein disclosed fulfill the objectives stated above, it will be appreciated that numerous modifications and other embodiments may be devised by one of ordinary skill in the art. Accordingly, it will be understood that the appended claims are intended to cover all such modifications and embodiments, which come within the spirit and scope of the present invention.

What is claimed is:

1. A portable thermal device comprising:
   a housing having an opening;
   a thermally conductive container contained in the housing and accessible through the opening;
   one or more batteries contained in the housing;
   an electrical heater in thermal contact with the thermally conductive container;
   a power supply circuit in electrical communication between the electrical heater and the one or more batteries to power the electrical heater; and
   a controller communicatively coupled to the electrical heater and the power supply and which:
      identifies a thermal profile associated for preparing and maintaining a particular product in the thermal conductive container;
      determines an amount of stored power in the one or more batteries;
      predicts a future time limitation on performing the thermal profile based at least in part on the thermal profile and the amount of stored power; and
      communicates via a user interface the predicted future time limitation on performing the thermal profile based on the stored power.

2. The portable thermal device of claim 1, wherein:
   the electrical heater comprises one or more metal oxide semiconductor field effect transistors (MOSFETs) in thermal contact with the thermally conductive container; and
   the power supply circuit is in electrical communication between the electrical heater and the one or more batteries to power the electrical heater by driving the one or more MOSFETs in a heat generating range.

3. The portable thermal device of claim 2, wherein the controller:
   determines the quantity and initial temperature of the particular product; and
   predicts the future time limitation on performing the thermal profile based at least in part on the quantity and the initial temperature of the particular product.

4. The portable thermal device of claim 1, further comprising a scanning device that identifies product information on product packaging, wherein the controller identifies the thermal profile based on accessing a thermal profile associated with the identified product information.

5. The portable thermal device of claim 4, further comprising a user interface device, wherein the thermal profile comprises a consumption temperature range, the controller performs the thermal profile to reach temperature range; and, in response to reaching the temperature range, indicates, via the user interface device, that the particular product can be used.

6. The portable thermal device of claim 5, wherein the thermal profile comprises a safety limitation defined by a maximum time within a pre-defined temperature range, wherein the controller: monitors the amount of time that the particular product is within the pre-defined temperature range; and in response to the amount of time exceeding the maximum time, presenting an indication via the user interface device.

7. The portable thermal device of claim 6, further comprising:
a lid pivotably coupled to the opening of the housing and movable between an open position and a closed position, and
an electrically-actuated lid lock attached to at least one of the housing and the lid and communicatively coupled to the controller; and wherein the controller, in response to the amount of time exceeding the maximum time, prevents access to the particular product in the thermally conductive container by controlling the electrically-actuated lid lock to lock the lid in the closed position.

8. The portable thermal device of claim 5, wherein the thermal profile comprises a safety limitation defined by a minimum time within a pre-defined temperature range, wherein the controller: monitors the amount of time that the particular product is within the pre-defined temperature range; and in response to the amount of time being less than the minimum time, presenting an indication via the user interface device.

9. The portable thermal device of claim 8, further comprising:
a lid pivotably coupled to the opening of the housing and movable between an open position and a closed position, and
an electrically-actuated lid lock attached to at least one of the housing and the lid and communicatively coupled to the controller; and wherein the controller, in response to the amount of time being less than the minimum time, prevents access to the particular product in the thermally conductive container by controlling the electrically-actuated lid lock to lock the lid in the closed position.

10. The portable thermal device of claim 1, wherein the controller:
presents an affordance on a user interface device;
in response to receiving a user input to the affordance, wirelessly communicates with the portable thermal device to trigger a warming event;
presents a user-perceptible alarm to load the portable thermal device; monitors temperature of the portable thermal device;
stores historical data associated with the time and temperature of activations of the portable thermal device; and
presents the historical data on the user interface device.

11. The portable thermal device of claim 10, wherein the controller uploads the historical data to a remote network data repository.

12. The portable thermal device of claim 2, wherein the controller:
automatically identifies an age of a recipient of the product comprising one of a food and a beverage; and
identifies the thermal profile based in part on the age of the recipient.

13. The portable thermal device of claim 10, wherein the controller schedules the warming event for a future time.

14. A method of operating a portable thermal device, the method comprising:
identifying a thermal profile associated for preparing and maintaining a particular product in a thermal conductive container of a portable thermal device;
associating the thermal profile with stored power in one or more batteries of the portable thermal device;
monitoring a temperature of the particular product; activating a heater that is in thermal contact with the thermal conductive container to adjust the temperature of the particular product according to the thermal profile; and
communicating via a user interface a predicted future limitation on performing the thermal profile based on the stored power.

15. The method of claim 14, wherein activating the heater comprises driving current through one or more metal oxide semiconductor field-effect transistors (MOSFETs) in a range sufficient to generate heat without damaging the MOSFETs.

16. The method of claim 14, further comprising:
determining the quantity and initial temperature of the particular product; and
predicting the future time limitation on performing the thermal profile based at least in part on the quantity and the initial temperature of the particular product.

17. The method of claim 14, further comprising:
scanning indicia on packaging of the particular product for identifying information; and
identifying the thermal profile based on the identifying information.

18. The method of claim 14, further comprising:
determining a safety limitation defined by a maximum time within a pre-defined temperature range that is associated with the thermal profile;
monitoring the amount of time that the particular product is within the pre-defined temperature range; and
presenting an indication via the user interface device in response to the amount of time exceeding the maximum time.

19. The method of claim 18, further comprising preventing access to the particular product in the thermally conductive container in response to the amount of time exceeding a maximum time.

20. The method of claim 14, further comprising:
determining a safety limitation defined by a minimum time within a pre-defined temperature range that is associated with the thermal profile;
monitoring the amount of time that the particular product is within the pre-defined temperature range; and
presenting an indication via the user interface device in response to the amount of time being less than the minimum time.

* * * * *